United States Patent
Tobinai et al.

(10) Patent No.: US 6,347,787 B1
(45) Date of Patent: Feb. 19, 2002

(54) CARBURETOR WITH AIR AND THROTTLE VALVE FOR TWO-CYCLE ENGINE

(75) Inventors: Teruhiko Tobinai; Shin-Ichi Ohgane, both of Miyagi (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 09/531,711

(22) Filed: Mar. 21, 2000

(30) Foreign Application Priority Data

Mar. 29, 1999 (JP) .......................................... 11-086971

(51) Int. Cl.$^7$ ................................................. F02M 7/26
(52) U.S. Cl. ........................ 261/23.3; 261/46; 261/47; 261/DIG. 1
(58) Field of Search ........................... 261/23.3, 46, 47, 261/23.2, DIG. 1

(56) References Cited

U.S. PATENT DOCUMENTS

| | | | |
|---|---|---|---|
| 2,325,010 A | 7/1943 | McCurdy .................. | 261/47 X |
| 3,174,469 A | * 3/1965 | Rappolt .................... | 261/47 X |
| 3,439,658 A | 4/1969 | Simonet .................... | 261/23.3 |
| 4,060,062 A | 11/1977 | Tsutsui et al. ............. | 261/23.3 |
| 4,073,278 A | 2/1978 | Glenn ......................... | 261/47 |
| 4,094,931 A | 6/1978 | Karino ....................... | 261/23.3 |
| 4,182,295 A | 1/1980 | Zeller et al. ........... | 123/119 EC |
| 4,200,083 A | 4/1980 | Ishida ...................... | 261/47 X |
| 4,256,063 A | * 3/1981 | Sumiyoshi et al. ..... | 261/23.3 X |
| 4,294,205 A | * 10/1981 | Iiyama et al. ......... | 261/23.3 X |
| 4,333,429 A | 6/1982 | Iiyama et al. ......... | 261/23.3 X |
| 4,796,579 A | 1/1989 | Wolfe et al. ................ | 123/336 |
| 5,036,816 A | 8/1991 | Mann ......................... | 123/361 |
| 5,200,118 A | 4/1993 | Hermle ....................... | 261/64.6 |
| 6,000,683 A | 12/1999 | Van Allen ................... | 261/52 |

FOREIGN PATENT DOCUMENTS

| | | |
|---|---|---|
| DE | 342274 | 10/1921 |
| DE | 432953 | 8/1926 |
| DE | 2204192 | 8/1973 |
| DE | 2909637 | 10/1979 |
| DE | 3722424 | 1/1988 |
| EP | 0651142 | 5/1995 |
| JP | 57183520 | 11/1982 |
| JP | 09268918 | 10/1997 |
| WO | 9817902 | 4/1998 |

\* cited by examiner

*Primary Examiner*—Richard L. Chiesa
(74) *Attorney, Agent, or Firm*—Reising, Ethington, Barnes, Kisselle, Learman & McCulloch, P.C.

(57) ABSTRACT

A carburetor for providing a fuel and air mixture and a scavenging air supply to a two stroke internal combustion engine has a throttle valve received in a fuel and air mixing passage and connected to a throttle drive for controlling engine operation and an air valve received in an air passage and selectively operably connected to the throttle valve by a lost motion coupling. Preferably, the throttle valve and the air valve are barrel-type valves each comprising an opening formed through a shaft extending transversely through and rotatable within an associated bore of the carburetor body. The lost motion coupling may comprise a pair of selectively meshed gears consisting of a first partial gear connected to a shaft of the throttle valve for co-rotation with the throttle valve shaft, and a second partial gear connected to a shaft of the air valve for co-rotation with the air valve shaft and having a gap between two adjacent teeth so that the first partial gear does not mesh with the second partial gear until the throttle valve has rotated to a predetermined angle or position from an idle position. A gear ratio of the gear pair is set in such a manner that the throttle valve and the air valve are simultaneously operable at a fully opened position to permit substantially unrestricted fluid flow through their respective passages in the carburetor body.

5 Claims, 2 Drawing Sheets

CARBURETOR WITH AIR AND THROTTLE VALVE FOR TWO-CYCLE ENGINE

FIELD OF THE INVENTION

This invention relates to a carburetor for a two stroke engine and more particularly to a carburetor which provides a scavenging air supply independently of a fuel and air mixture.

BACKGROUND OF THE INVENTION

In a conventional crankcase compression type two stroke internal combustion engine, a fuel and air mixture is supplied to the engine crankcase through a fuel and air mixing passage in the carburetor. The fuel and air mixture in the crankcase is pressurized in the crankcase during a portion of the stroke of a piston of the engine and is supplied through a scavenging or transfer port to a combustion chamber of the engine cylinder to assist the scavenging of combustion gases which remain in the cylinder and to provide a fresh fuel and air mixture for the next combustion event. Undesirably, a portion of the fresh fuel and air mixture provided to the combustion chamber escapes through the exhaust port with the exhaust gas thereby increasing the hydrocarbon content of the engine emissions and reducing the fuel efficiency of the engine.

At least in part to reduce engine hydrocarbon emissions and improve fuel efficiency, it has been proposed to provide a scavenging air supply to the engine through a second bore in the carburetor. A throttle valve may be used to control fluid flow through the fuel and air mixture passage and an air valve to control the scavenging air flow through the second bore. An example of a conventional carburetor having the throttle valve and air valve provided in a carburetor body is shown in Japanese Patent No. 9,268,918

However, at least at engine idle operation, the scavenging air supply is undesirable as it provides too much air to the engine causing an undesirably lean fuel and air mixture in the engine and poor engine performance, stability and acceleration. Therefore, selective control of the scavenging air supply relative to the fuel and air mixture supply, is needed. However, in a carburetor wherein the throttle valve and the air valve are barrel type valves formed integrally with each other, in order to control the opening time of the air valve relative to the throttle valve, the throttle valve and the air valve must have different diameters or there must be a difference in the extent to which the valves open. Forming the valves of different diameter increases the cost to make the valves and the cost to manufacture the carburetor to accommodate the differently sized valves. Limiting the extent to which the air valve opens is also undesirable because at wide open throttle operating conditions, it is desirable to provide as much air as possible to the engine to assist in scavenging exhaust gases, to increase the mixing of fuel and air in the combustion chamber and to support combustion of the fuel and air mixture in the combustion chamber.

SUMMARY OF THE INVENTION

A carburetor for providing a fuel and air mixture and a scavenging air supply to a two stroke internal combustion engine has a throttle valve received in a fuel and air mixing passage and connected to a throttle drive for controlling engine operation and an air valve received in an air passage and selectively operably connected to the throttle valve by a lost motion coupling. Preferably, the throttle valve and the air valve are barrel-type valves each comprising an opening formed through a shaft extending transversely through and rotatable within an associated bore of the carburetor body. The lost motion coupling may comprise a pair of selectively meshed gears consisting of a first partial gear connected to a shaft of the throttle valve for co-rotation with the throttle valve shaft, and a second partial gear connected to a shaft of the air valve for co-rotation with the air valve shaft. A gear ratio of the gear pair is set in such a manner that the first partial gear does not mesh with the second partial gear until the throttle valve has rotated to a predetermined angle or partially open position from an idle position and the throttle valve and the air valve are simultaneously operable at a fully opened position to permit substantially unrestricted fluid flow through their respective passages in the carburetor body.

To increase the engine operating speed or power from engine idle operation, a throttle valve lever is rotated against a spring biasing it to its idle position by means of an operating lever through a remote cable, to ether open the throttle valve from its idle position towards its wide open position. According to the invention, when the first partial gear has rotated a predetermined angle, the first partial gear abuts against or initially meshes with the second partial gear which is connected to a shaft of the air valve and continued opening of the throttle valve causes the first partial gear to drive the second partial gear for rotation. This rotation of the second partial gear rotates the air valve from its fully closed position toward its fully open position. The first partial gear continues to rotate the second partial gear to increase the opening degree of the air valve until it reaches its fully opened position preferably at the same time the throttle valve reaches its wide open position. In this manner the throttle valve and the air valve can be simultaneously opened, by providing the throttle valve and the air valve as separate members connected to the gears which have different outer diameters, and by selecting shapes and numbers of teeth of the gears, and determining an appropriate gear ratio.

Objects, features and advantages of the invention include providing a carburetor for supplying a fuel and air mixture to an engine and selectively supplying a scavenging air supply to the engine which terminates the scavenging air supply at low speed and low load engine operation, permits timing of the initial opening of the air valve relative to the throttle valve of the carburetor to be freely set, selectively interconnects the throttle valve and air valve, permits at least some relative movement between the throttle valve and air valve, may have a throttle valve and an air valve which need not be different from each other in diameter or in the degree or extent to which they open in order to retard the opening time of the air valve and inhibit or prevent providing the scavenging air supply at least at engine idle operation, does not interconnect the throttle valve and air valve with a lever and link arrangement, avoids providing too much air to the engine, improves engine operation, reduces engine emissions, increases engine fuel efficiency, is of relatively simple design and economical manufacture and assembly, reliable and in service has a long useful life.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
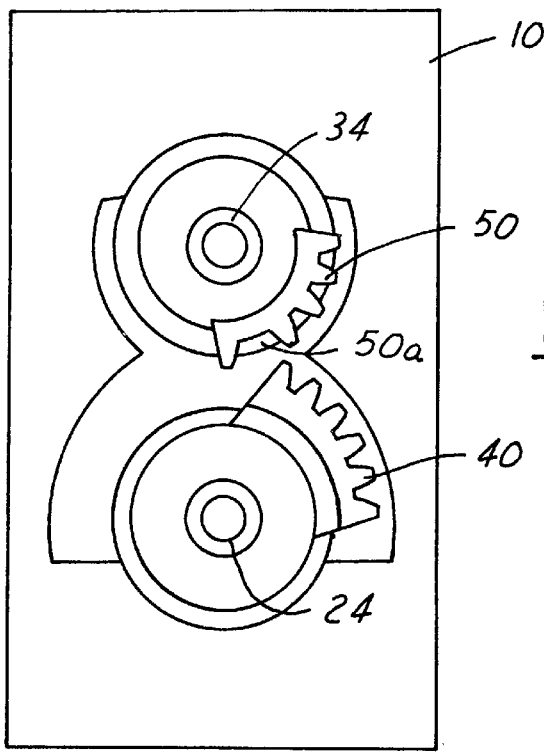
FIG. 1 is a plan view of a carburetor for a two stroke internal combustion engine according to the invention illustrating a relationship between a first partial gear and a second partial gear at a position corresponding to idle engine operation.
Figure 2:
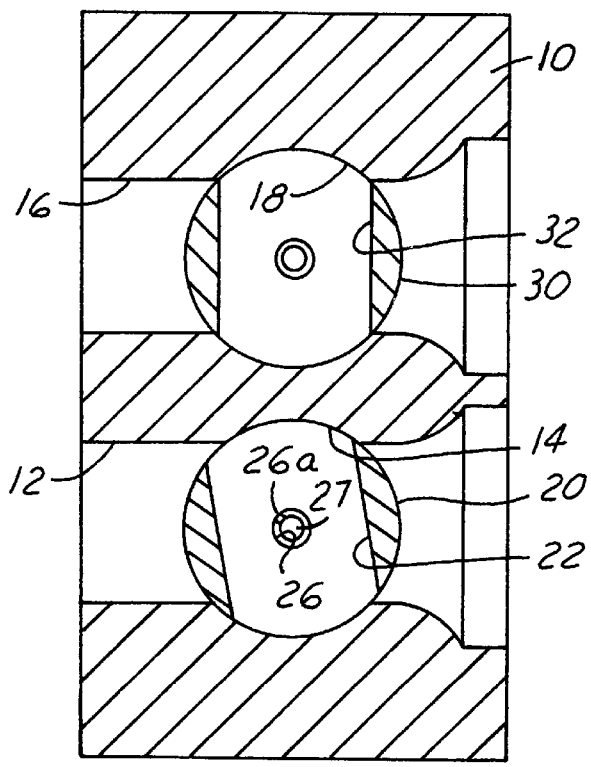
FIG. 2 is a sectional view of the carburetor of FIG. 1 illustrating the idle position of a throttle valve and a fully closed position of an air valve of the carburetor set for idle engine operation as in FIG. 1.

Referring in more detail to the drawings, FIGS. 1 and 2 illustrate a carburetor 10 for a two-stroke internal combustion engine which is constructed to selectively deliver to the engine a scavenging air supply through an air passage 16 independently of a fuel and air mixture provided to the engine through a fuel and air mixing passage 12. As shown in FIG. 2, the carburetor 10 has a body 11 in which the air passage 16 and the fuel and air mixing passage 12 are formed. A barrel type throttle valve 20 has a shaft 24 which extends through a cylindrical bore 14 generally transversely through the fuel and air mixing passage 12 and has a throttle bore 22 therethrough. The throttle valve shaft 24 is connected to a throttle lever (not shown) which is actuated to control the movement of the throttle valve 20 and hence, the operation of the engine between idle and wide open throttle engine operating conditions. A barrel type air valve 30 has a shaft 34 which extends through another cylindrical bore 18 generally transversely through the air passage 16 and has an air bore 32 therethrough. The throttle valve shaft 24 and air valve shaft 34 are each rotatable within their bores 14,18 on an axis generally transverse to their respective passages 12,16 and parallel to each other to control the extent to which the throttle bore 22 and the air bore 32 are aligned with their respective passages 12,16 to control the fluid flow through the passages 12,16.

In a conventional manner, the carburetor body 11 includes in its lower part a constant pressure fuel chamber and an atmospheric chamber which are partitioned by means of a membrane or diaphragm. The constant pressure fuel chamber is supplied with fuel from a fuel tank by a fuel pump and is maintained at a predetermined pressure. A fuel nozzle 26 projects from the fuel chamber into the throttle bore 22 of the throttle valve 20. A rod valve 27 (FIG. 2) projecting into the throttle bore 22 is inserted into the fuel nozzle 26 so as to adjust the extent to which a fuel jet port 26a of the fuel nozzle 26 is open. By rotating the throttle valve lever against a force of a return spring which biases the throttle valve lever and hence, the throttle valve 20, to their idle positions, the extent to which the throttle valve 20 is open is increased. At the same time, the rod valve 27 is moved axially relative to the fuel nozzle 26 by means of a cam mechanism which is formed between the throttle valve lever and an upper end wall of the carburetor body to increase the degree to which the fuel jet port 26a of the fuel nozzle 26 is opened. This permits a greater volume of fuel to flow through the fuel jet port 26a as the engine accelerates from idle towards wide open throttle operation and hence, requires more fuel for its operation.

As shown in FIG. 2, at idle engine operation, the throttle valve 20 is yieldably rotationally biased to its idle position and the air valve 30 is also yieldably rotationally biased to its fully closed position by separate return springs (not shown). At the idle position of the throttle valve 20, the throttle bore 22 is only slightly open to the air intake passage 12, and a mixture of air drawn through the fuel and air mixing passage 12 and fuel from the fuel nozzle 26 is supplied to a crankcase of the engine. In its fully closed position corresponding to idle engine operation, the air bore 32 of the air valve 30 is rotated completely out of registry with the air passage 16 to prevent fluid flow past the air valve 30 so that scavenging air will not be supplied to the cylinder of the engine.

Figure 3:
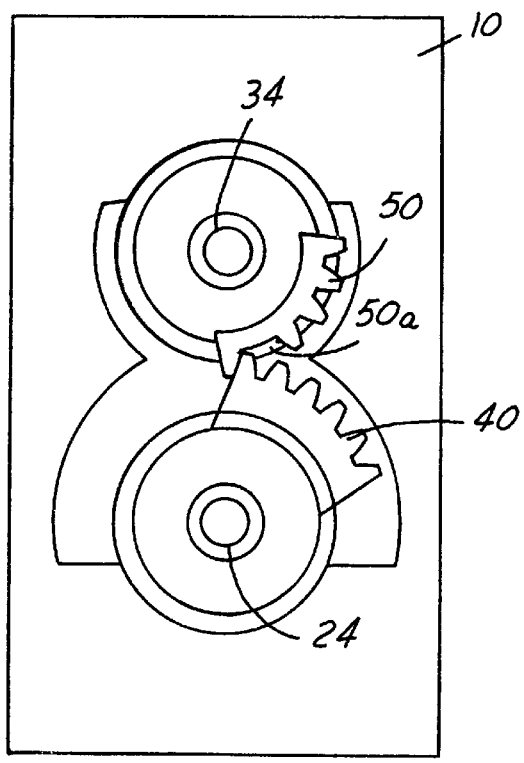
FIG. 3 is a plan view illustrating a relationship between the first partial gear and the second partial gear at a position corresponding to a low speed, low load operation of the engine between idle and wide open throttle engine operation.

As shown in FIG. 1, a first partial gear 40 is connected to the throttle valve shaft 24 for co-movement therewith. A second partial gear 50 is connected to the air valve shaft 34 and is engageable with the first partial gear 40 during at least a portion of the throttle valve 20 movement from its idle position to its wide open position to drive the second partial gear 50 and hence, the air valve 30 for rotation. The second partial gear 50 has a tooth missing from its profile providing a gap 50a between its first and second teeth so that in its idle position and upon initial rotation of the throttle valve 20 from its idle position, a first tooth of the first partial gear 40 does not engage the second partial gear 50. As shown in FIG. 3, the first partial gear 40 does not engage the second partial gear 50 until the throttle valve 20 is opened or rotated a predetermined amount from its idle position.

Figure 4:
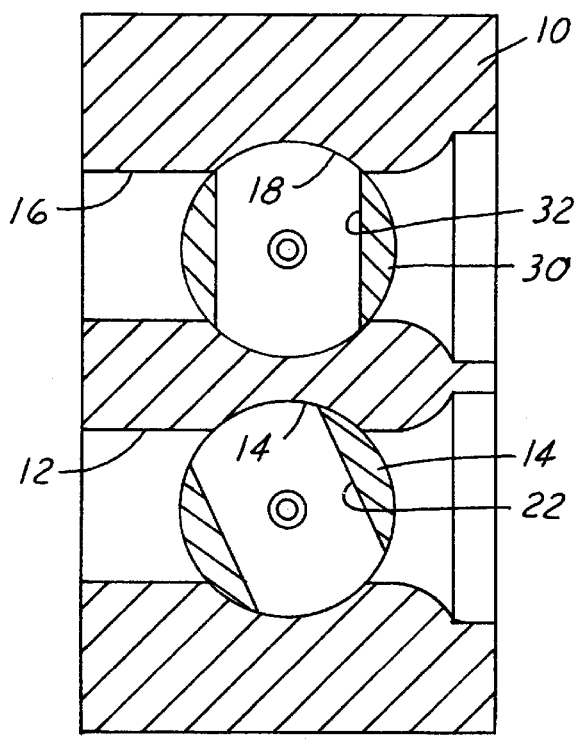
FIG. 4 is a sectional view illustrating the positions of both the throttle valve and the air valve at the low speed, low load engine operation as in FIG. 3.

As shown in FIG. 4, at low speed operation of the engine above idle, the throttle valve 20 is opened further than at the idle position (FIG. 2), and a greater amount of the fuel and air mixture than at the idle position is supplied to the engine. The air valve 30 remains in its fully closed position preventing communication between the air bore 32 and the air passage 16, and a scavenging air supply is not provided to the engine.

As shown in FIG. 3, at this low speed engine operation, the first partial gear 40 is in contact with the second partial gear 50 but has not begun to rotate the second partial gear 50. In short, when the first partial gear 40 of the throttle valve 20 has rotated away from its idle position by a predetermined angle, it comes into contact with the second partial gear 50 of the air valve 30. Further rotation of the first partial gear 40 beyond the predetermined angle at which the gears 40,50 initially engage or mesh, rotates the second partial gear 50 and hence, rotates the air valve 30 to open it.

Figure 6:
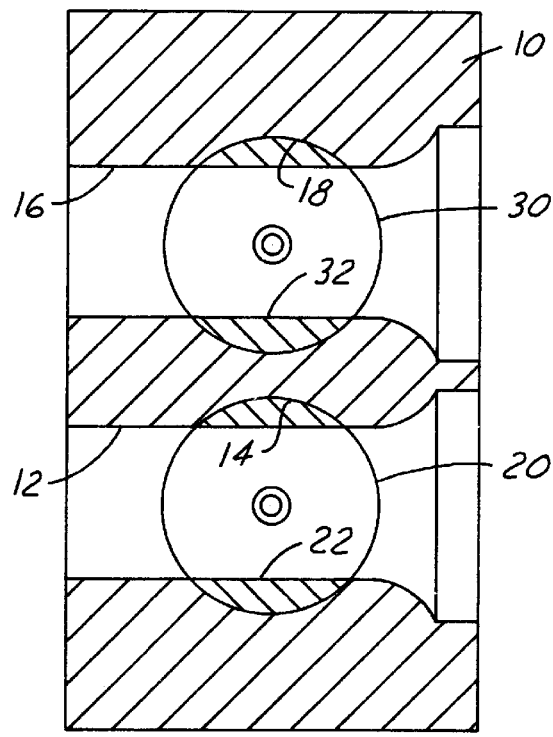
FIG. 6 is a sectional view illustrating the positions of both the throttle valve and the air valve at the high speed or wide open throttle engine operation as in FIG. 5.

As shown in FIG. 6, at high speed or wide open throttle engine operation, the throttle valve 20 is fully opened, and a larger amount of the fuel and air mixture than at the lower speed operation is supplied to the engine. At the same time, the air valve 30 is also fully opened to supply scavenging air from the air passage 16 to the cylinder of the engine.

Figure 5:
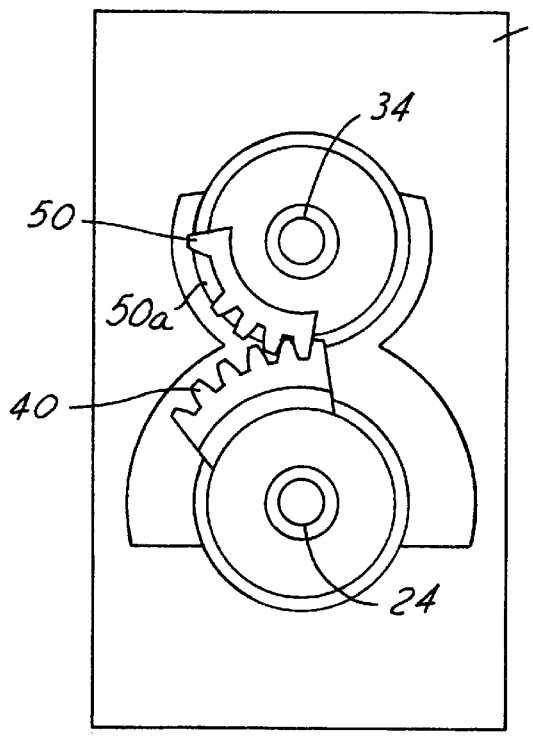
FIG. 5 is a plan view illustrating a relationship between the first partial gear and the second partial gear at a position corresponding to high speed or wide open throttle engine operation.

As shown in FIG. 5, at the high speed or wide open throttle engine operation, while the throttle valve 20 rotates from the position as shown in FIG. 4 to the position as shown in FIG. 6, the first partial gear 40 causes the second partial gear 50 to rotate from the position as shown in FIG. 3 to the position as shown in FIG. 5 along with the rotation of the first partial gear 40.

Now, the operation of the carburetor 10 for the two stroke internal combustion engine will be described. When the throttle valve lever (not shown) is rotated against the force of its return spring by means of an operating lever (not shown) usually through a remote control cable, the throttle valve 20 rotates from its idle position as shown in FIG. 2 to its low speed position as shown in FIG. 4, thus increasing the degree to which the throttle valve 20 is opened. During this period, the first partial gear 40 connected to the throttle valve shaft 24 rotates from the position as shown in FIG. 1 to the position as shown in FIG. 3. During this rotation of the first partial gear 40 it is not engaged or meshed with the second partial gear 50, and therefore, the second partial gear 50 does not rotate which keeps the air valve 30 fully closed as shown in FIG. 4. Accordingly, at the idle and low speed operation of the engine, only the fuel and air mixture is supplied to the engine through the throttle valve 20 and fuel and air mixture passage 12, the scavenging air supply is not provided to the engine. Therefore, an overly lean fuel and air mixture condition in the engine cylinder will be avoided, and drawbacks such as a decrease in the output and stability of the engine will be eliminated.

When the throttle valve lever is further rotated against the force of its return spring by means of the operating lever through the remote control cable, the throttle valve 20 rotates from its low speed position shown in FIG. 4 to its high speed or wide open position shown in FIG. 6 permitting substantially unrestricted fluid flow through the throttle valve 20. Meanwhile, the first partial gear 40 connected to the throttle valve shaft 24 rotates from its low speed position shown in FIG. 3 to its high speed position shown in FIG. 5 to likewise rotate the second partial gear 50. Along with the rotation of the second partial gear 50, the air valve 30 is rotated from its fully closed position shown in FIG. 4 to its fully open position shown in FIG. 6 permitting a substantially unrestricted air flow through the air passage 16. The fuel and air mixture is supplied to the engine according to the degree to which the throttle valve 20 is opened, and simultaneously air is supplied to the cylinder according to the degree to which the air valve 30 is opened.

Preferably, during an exhaust or scavenging stage of the engine cycle, the scavenging air supply is first introduced to the combustion chamber to facilitate the removal of exhaust gases from the combustion chamber. Then the fuel and air mixture is supplied to the combustion chamber and the scavenging air and the fuel and air mixture are in a layered or stratified state in the combustion chamber to inhibit the escape through an exhaust port of the fresh fuel and air mixture. This greatly reduces the hydrocarbon content of the engine emissions, improves fuel efficiency, and improves stability and performance of the engine.

Advantageously, with the carburetor constructed as above described, there is no need to make the throttle valve 20 and the air valve 30 different in diameter or in the degree to which they are opened to retard or delay the opening of the air valve 30 relative to the opening of the throttle valve 20. The throttle valve 20 and the air valve 30 can be moved to their fully or wide open positions simultaneously which is desirable to support wide open throttle operation of the engine. Further, the outer diameters of the throttle valve 20 and the air valve 30 can be as small as possible and may be equal to each other to facilitate manufacturing the valves and the carburetor to receive the valves. To delay the opening of the air valve 30 relative to the opening of the throttle valve 20, the second partial gear may have a tooth missing from its profile or may otherwise have a gap which delays initial meshing or engagement of the gears 40,50. Also, the rate at which the air valve 30 and throttle valve 20 open may be varied and controlled by selecting the relative size of the gears 40,50, and by selecting shapes and numbers of teeth of the gears, and determining an appropriate gear ratio.

What is claimed is:

1. A carburetor, comprising:

a body having a fuel and air mixing passage and a separate air passage;

a throttle valve received in the body and rotatable between idle and wide open positions and having a throttle valve shaft extending generally transversely through the fuel and air mixing passage with a throttle bore through the shaft;

an air valve received in the body and rotatable between fully closed and fully open positions and having an air valve shaft extending generally transversely through the air passage with an air bore through the air valve shaft; and a lost motion coupling selectively connecting the throttle valve and the air valve to permit rotation of the throttle valve relative to the air valve from its idle position to a predetermined position between its idle and wide open positions and to thereafter cause rotation of the air valve in response to rotation of the throttle valve with both the air valve and throttle valve being simultaneously operable in their respective fully open and wide open positions.

2. The carburetor of claim 1 wherein the lost motion coupling comprises a first gear connected to the throttle valve shaft for co-rotation with the throttle valve shaft and a second gear connected to the air valve shaft for co-rotation with the air valve shaft and being engageable with the first gear during at least a portion of the rotation of the first gear.

3. The carburetor of claim 2 wherein both the first gear and second gear are partial gears having a gear ratio set to permit the throttle valve and air valve to operate simultaneously in their respective wide open and fully open positions.

4. The carburetor of claim 2 wherein the second gear has a gap between a first tooth and a second tooth to delay initial meshing of the first and second gears.

5. The carburetor of claim 4 wherein the second gear has a tooth missing between the first tooth and second tooth to define the gap.

\* \* \* \* \*